United States Patent [19]

Peiffer et al.

[11] Patent Number: 4,465,801

[45] Date of Patent: Aug. 14, 1984

[54] INTERFACIAL VISCOSIFICATION OF AQUEOUS SYSTEM UTILIZING SULFONATED IONOMERS

[75] Inventors: Dennis G. Peiffer, East Brunswick; Robert D. Lundberg, Bridgewater, both of N.J.; Thad O. Walker, Humble, Tex.

[73] Assignee: Exxon Research & Engineering Co., Florham Park, N.J.

[21] Appl. No.: 374,197

[22] Filed: May 3, 1982

[51] Int. Cl.$^3$ .............................................. C08K 5/05
[52] U.S. Cl. ................................. 524/389; 524/110; 524/111; 524/140; 524/233; 524/236; 524/251; 524/574; 524/577; 524/565; 524/583; 524/586
[58] Field of Search ............... 524/389, 110, 111, 140, 524/233, 236, 251, 574

[56] References Cited

U.S. PATENT DOCUMENTS

| | | | |
|---|---|---|---|
| 3,216,962 | 11/1965 | Gatza .................................. | 524/377 |
| 3,287,306 | 11/1966 | Hatch et al. ........................ | 524/376 |
| 3,629,175 | 12/1971 | Moore et al. ...................... | 524/383 |
| 3,679,641 | 7/1972 | Takeya ................................ | 526/240 |
| 4,322,329 | 3/1982 | Lundberg et al. .................. | 524/566 |

*Primary Examiner*—Joseph L. Schofer
*Assistant Examiner*—N. Sarofim
*Attorney, Agent, or Firm*—Richard E. Nanfeldt

[57] ABSTRACT

The present invention relates to a process for the viscosification of an aqueous liquid which includes the steps of forming a solvent system of an organic liquid or oil and a polar cosolvent, the polar cosolvent being less than about 15 weight percent of the solvent system, a viscosity of the solvent system being less than about 100 cps; dissolving a neutralized sulfonated polymer in the solvent system to form a solution, a concentration of the neutralized sulfonated polymer in the solution being about 0.01 to about 0.5 weight percent, a viscosity of the solution being less than about 200 cps; and admixing or contacting said solution with about 5 to about 500 volume percent water, the water being immiscible with the organic liquid and the polar cosolvent and neutralized sulfonated polymer transferring from the organic liquid to the water phase, thereby causing the water phase to thicken.

19 Claims, No Drawings

INTERFACIAL VISCOSIFICATION OF AQUEOUS SYSTEM UTILIZING SULFONATED IONOMERS

BACKGROUND OF THE INVENTION

1. Field of the Invention

The present invention relates to a process for the viscosification of an aqueous liquid which includes the steps of forming a solvent system of an organic liquid or oil and a polar cosolvent, the polar cosolvent being less than about 15 weight percent of the solvent system, a viscosity of the solvent system being less than about 1,000 cps; dissolving a neutralized sulfonated polymer (water insoluble) in the solvent system to form a solution, a concentration of the neutralized sulfonated polymer in the solution being about 0.01 to about 0.5 weight percent, a viscosity of the solution being less than about 200 cps; and admixing or contacting said solution with about 5 to about 500 volume percent water, the water being immiscible with the organic liquid and the polar cosolvent and neutralized sulfonated polymer transferring from the organic liquid to the water phase, thereby causing the water phase to gel (i.e. thicken).

2. Description of the Prior Art

There are many applications for very viscous or gelled solutions of polymers in water which are quite diverse. There are also a number of physical and chemical techniques for preparing such systems. The present invention is concerned with a process for gelling an aqueous system by contacting the aqueous system with a relatively low viscosity, organic liquid solution of an ionic polymer. The potential applications for this process and the products derived therefrom will be evident in the instant application. Some of these applications are as a viscosifier for aqueous solutions, for viscosification of aqueous acid and inorganic salt solutions, as a fluid loss additive, in enhanced oil recovery, as a viscous foamer in oil well applications, as a water shut-off means in oil well applications, as a spacer and soluble pig in oil well applications and as a friction reducer in transferring liquid through a pipe.

The instant invention differs from a number of applications, Ser. Nos. 223,482; 136,837; and 106,027, filed by Robert Lundberg et al, one of the instant inventors. These previously filed applications were directed to the gelling of the organic liquid by a water insoluble, neutralized sulfonated polymer whereas the instant invention is directed to the gelling of an aqueous phase. Quite unexpectedly, it has been discovered that when the concentration of the sulfonated polymer in solution is maintained in a critical concentration range of 0.01 to 0.5 weight percent of the total volume of solvent, which is a mixture of nonpolar organic liquid and a polar cosolvent, is agitated with an aqueous solution, a transfer of the polar solvent and water insoluble neutralized sulfonated polymer from the organic liquid phase to the water phase occurs. The water insoluble neutralized sulfonated polymer causes the water phase to gel, wherein the neutralized sulfonated polymer is insoluble in the water phase. In the previously filed patent applications, substantial viscosification of the nonpolar organic liquid phase did not occur until the concentration of the neutralized sulfonated polymer was sufficiently high enough to permit chain entanglement of adjacent polymer molecules thereby completely filling the solvent space. The gelation of the aqueous phase of the instant invention does not occur by this previously described mechanism because the resultant concentration of water insoluble, neutralized sulfonated polymer is not sufficiently high enough to permit chain entanglement. The mechanism of gelation of the aqueous phase, as defined in the instant invention, occurs by the formation of macroscopic, spherical polymer membranes or films dispersed throughout the aqueous fluid, (i.e. interfacial viscosification) wherein large volumes of the water of the aqueous liquid are encapsulated within a series of minute polymer bags.

The instant invention describes a process which permits (1) the preparation of polymer solutions of sulfonated polymers in organic liquid having reasonably low viscosities (i.e., less than about 200 cps); and (2) the preparation of extremely viscous solutions or gels of an aqueous fluid from such solutions by a process of mixing or contacting water with the polymer solution. These operations are achieved by the use of the appropriate concentration; 0.01 to 0.5 weight percent of water insoluble, neutralized sulfonated polymers, having low concentrations of ionic groups present, preferably metal sulfonate groups. Such polymers are described in detail in a number of U.S. Patents (U.S. Pat. Nos. 3,836,511; 3,870,841; 3,847,854; 3,642,728; and 3,921,021) which are herein incorporated by reference. These polymers possess unusual solution characteristics some of which are described in U.S. Pat. No. 3,931,021. Specifically, these polymers, such as lightly sulfonated polystyrene, containing about 2 mole percent sodium sulfonate pendant to the aromatic groups, are typically not soluble in solvents commonly employed for polystyrene itself. However, the incorporation of modest levels of polar cosolvents permit the rapid dissolution of such ionic polymers to form homogeneous solutions of moderate viscosity.

In the instant process, the role of the polar cosolvent is that of solvating the ionic groups while the main body of the solvent interacts with the polymer backbone. For example, xylene is an excellent solvent for the polystyrene backbone and when combined with 5 percent methanol will dissolve, readily and rapidly, the previous example of lightly sulfonated polystyrene.

The remarkable and surprising discovery of the instant invention is that when small (or large) amounts of water are combined and mixed with solutions of ionic polymers dissolved at low concentrations (0.01 to 0.5 weight percent) in such mixed solvent systems as those described above, a phase transfer of the water insoluble, neutralized sulfonated polymer and cosolvent occurs from the nonpolar organic liquid phase to the water phase, wherein the water insoluble, neutralized sulfonated polymers cause the water phase to gel. Indeed, it is possible to achieve increases in viscosity of the water phase by factors of $10^3$ (1,000) or more by the addition of only 5 to 15 percent water based on the polymer solution volume. This unusual behavior is postulated to arise from the removal of the polar cosolvent and water insoluble, neutralized sulfonated polymer from the organic liquid phase into the separate aqueous phase which then gels.

SUMMARY OF THE INVENTION

The present invention relates to a process for the gelation of an aqueous liquid which includes the steps of forming a solvent system of an organic liquid or oil and a polar cosolvent. The polar cosolvent being less than about 15 weight percent of the solvent system with a viscosity of the solvent system being less than about 100 cps; subsequently dissolving a neutralized sulfonated polymer in the solvent system to form a solution with a concentration of the neutralized sulfonated polymer in the solution being about 0.01 to about 0.5 weight percent. The viscosity of the solution being less than about 200 cps. Admixing or contacting said solution with about 5 to about 500 volume percent water, the water being immiscible with the organic liquid and the polar cosolvent and neutralized sulfonated polymer transferring from the organic liquid to the water phase, thereby causing the water phase to gel (i.e. thicken).

Accordingly, it is a primary object of the instant invention to describe an economical process for forming a highly viscous or gelled aqueous solution having a viscosity from about 50 to about 1,000 cps.

A further object of the instant invention is to provide a process for forming a gel solution which can be used as a viscosifier for aqueous systems or aqueous acid systems, and friction reducers for controlling the flow and aqueous fluid through a pipe.

A still further object of the instant invention is to employ the instant process as an integral part of well control procedures such as enhanced oil recovery, water shut-off means, viscous foams and spacers and soluble pigs.

GENERAL DESCRIPTION

The present invention relates to a process for the gelation of an aqueous liquid which includes the steps of forming a solvent system of an organic liquid or oil and a polar cosolvent. The polar cosolvent being less than about 15 weight percent of the solvent system with a viscosity of the solvent system being less than about 100 cps. Subsequently dissolving a neutralized sulfonated polymer in the solvent system to form a solution with a concentration of the neutralized sulfonated polymer in the solution being about 0.01 to about 0.5 weight percent. The viscosity of the solution being less than about 200 cps. Admixing or contacting said solution with about 5 to about 500 volume percent water, the water being immiscible with the organic liquid and the polar cosolvent and neutralized sulfonated polymer transferring from the organic liquid to the water phase, thereby causing the water phase to gel.

The gelled aqueous phase having a viscosity greater than 50 cps is formed by the addition of water to a water insoluble solution which comprises a water insoluble, neutralized sulfonated polymer, a nonpolar organic liquid and a polar cosolvent, wherein the solution has a viscosity less than 200 cps. The concentration of neutralized sulfonated polymer in the solution is 0.01 to 0.5 weight percent. Upon the addition of water to the solution, the polar cosolvent and water insoluble, neutralized sulfonated polymer rapidly transfers from the solution to the aqueous water which undergoes immediate gelation. The nonpolar organic liquid can be removed from the gel by conventional liquid extraction methods. The formation of the aqueous fluid or water having a viscosity of at least 50 cps from the organic solution having a viscosity less than 200 cps, can be quite rapid in the order of less than 1 minute to about 24 hours, more preferably less than 1 minute to about 30 minutes, and most preferably less than 1 minute to about 10 minutes, however, this depends on temperature, shear, solvent type, etc.

The component materials of the instant process generally include a water insoluble, ionomeric polymer such as a water insoluble, neutralized sulfonated polymer at a critical concentration level of 0.01 to 0.5 weight percent, a nonpolar organic liquid, polar cosolvent and water.

Gelation of an aqueous phase does not occur, if one employs a conventional unsulfonated polymer or a water soluble, neutralized sulfonated polymer in place of the water insoluble, neutralized sulfonated polymer, but rather only classical phase separation occurs.

In the instant invention, the gelation of the aqueous phase occurs by the formation of geometrically shaped spheres of the water insoluble, neutralized sulfonated polymer within the aqueous phase, wherein the water is encapsulated within these geometrically shaped spheres (so-called water-in-water pseudo-emulsion). During the process, approximately 10 weight percent of the nonpolar organic liquid also transfers to the aqueous phase and is encapsulated within these geometrically shaped spheres.

A second aspect of the instant invention relates to the use of these materials in aqueous systems containing large concentrations of salt or acid. The sulfonated polystyrenes which are the preferred embodiment of this invention lose their effectiveness (i.e., as a water-in-water pseudo-emulsion former) in salt water, but are enhanced in acid-containing water. More specifically, it has been found that a suitable nonionic surfactant must be employed with the water insoluble, sulfonated polystyrene to give formulations which are effective in producing these water-in-water pseudo-emulsions in high concentrations of salt water. In acidic solutions, the nonionic surfactant is not needed for stability (25° C.), however, the viscosity of these pseudo-emulsion systems tends to increase significantly with the addition of small amounts of the nonionic material (typically <0.04 g/l).

In general, the water insoluble ionomeric polymer will comprise from about 10 to about 200 meq. pendant ionomeric groups per 100 grams of polymer, more preferably from 10 to 100 meq. pendant ionomeric groups. The ionic groups may be conveniently selected from the groups consisting of carboxylate, phosphonate, and sulfonate, preferably sulfonate groups. In most instances, the ionomers utilized in the instant invention are neutralized with the basic materials selected from Groups IA, IIA, IB and IIB of the Periodic Table of Elements and lead, tin and antimony, as well as ammonium and amine counterions. Ionic polymers which are subject to the process of the instant invention are illimitable and include both plastic and elastic polymers. Specific polymers include sulfonated polystyrene, sulfonated t-butyl styrene, sulfonated ethylene copolymers, sulfonated propylene copolymers, sulfonated styrene/acrylonitrile copolymers, sulfonated styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers. The preferred polymers of the instant invention are ethylene-propylene terpolymers and polystyrene, wherein polystyrene is most preferred.

Neutralization of the cited polymers with appropriate metal hydroxides, metal acetates, metal oxides, or ammonium hydroxide etc., can be conducted by means well-known in the art. For example, the sulfonation process as with Butyl rubber containing a small 0.3 to 1.0 mole percent unsaturation can be conducted in a suitable solvent such as toluene, with acetyl sulfate as the sulfonated agent, such as described in U.S. Pat. No. 3,836,511. The resulting sulfonic acid derivative can then be neutralized with a number of different neutralization agents such as a sodium phenolate and similar metal salts. The amounts of such neutralization agents employed will normally be equal stoichiometrically to the amount of free acid in the polymer plus any unreacted reagent which is still present. It is preferred that the amount of neutralizing agent be equal to the molar amount of sulfonating agent originally employed plus 10 percent more to insure full neutralization. The use of more of such neutralization agent is not critical. Sufficient neutralization agent is necessary to effect at least 50 percent neutralization of the sulfonic acid groups present in the polymer, preferably at least 90 percent, and most preferably essentially complete neutralization of such acid groups should be effected.

The degree of neutralization of said ionomeric groups may vary from 0 (free acid form) to greater than 100 mole percent, preferably 50 to 100 percent. With the utilization of neutralized ionomers in this instant invention, it is preferred that the degree of neutralization be substantially complete, that is with no substantial free acid present and without substantial excess of the base other than that needed to insure neutralization. The neutralized ionomers possess greater thermal stability compared to its acid form. Thus, it is clear that the polymers which are normally utilized in the instant invention comprise substantially neutralized pendant groups, and in fact, an excess of the neutralizing material may be utilized without defeating the objects of the instant invention.

The ionomeric polymers of the instant invention may vary in number average molecular weight from 1,000 to 10,000,000 preferably from 5,000 to 500,000, most preferably from 10,000 to 200,000. These polymers may be prepared by methods known in the art, for example, see U.S. Pat. No. 3,642,728, hereby incorporated by reference.

The preferred ionic copolymers for use in the instant invention, e.g., sulfonated polystyrene and substituted derivatives thereof, may be prepared by the procedures described in U.S. Pat. No. 3,870,841, filed Oct. 2, 1972, in the names of H. S. Makowski, R. D. Lundberg and G. H. Singhal, hereby incorporated by reference.

The water insoluble, ionomeric polymers may be incorporated into the organic liquid at a level of from 0.01 to 0.5 weight percent and more preferably from 0.01 to 0.4 weight percent, based on the organic liquid and the polar cosolvent.

Specific examples of preferred ionomeric polymers which are useful in the instant invention include sulfonated polystyrene, sulfonated poly-t-butyl styrene, sulfonated polyethylene (substantially noncrystalline), and sulfonated ethylene copolymers, sulfonated polypropylene (substantially noncrystalline), and sulfonated polypropylene copolymers, sulfonated styrenemethyl methacrylate copolymers, (styrene)-acrylic acid copolymers, sulfonated polyisobutylene, sulfonated ethylene-propylene terpolymers, sulfonated polyisoprene, sulfonated polyvinyl toluene and sulfonated polyvinyl toluene copolymers.

The ionomeric polymers of the instant invention may be prepared prior to incorporation into the organic solvent, or by neutralization of the acid from a situ. For example, preferably the acid derivative is neutralized immediately after preparation. For example, if the sulfonation of polystyrene is conducted in solution, then the neutralization of that acid derivative can be conducted immediately following the sulfonation procedure. The neutralized polymer may then be isolated by means well-known to those skilled in the art, i.e., coagulation, steam stripping, or solvent evaporation, because the neutralized polymer has sufficient thermal stability to be dried for employment at a later time in the process of the instant invention. It is well-known that the unneutralized sulfonic acid derivatives do not possess good thermal stability and the above operations avoid that problem.

It is also possible to neutralize the acid form of these polymers in situ; however, this is not a preferred operation, since in situ neutralization requires preparation of the sulfonic acid in the organic liquid which is to be subjected to the instant process, or the acid form of the ionic polymer must be dissolved in said organic liquid. The latter approach may involve handling of an acid form of an ionic polymer which has limited thermal stability. Therefore, it is quite apparent that the preparation and isolation of a neutralized ionic polymer affords the maximum latitude in formulation, less problems in handling polymers of limited thermal stability and maximum control over the final mixture of ionic polymer, polar cosolvent and organic liquid.

The organic liquids, which may be utilized in the instant invention, are selected with relation to the ionic polymer and vice-versa. The organic liquid is selected from the group consisting essentially of aromatic hydrocarbons, cyclic aliphatic ethers, aliphatic ethers, or organic aliphatic esters and mixtures thereof.

Specific examples of organic liquids to be employed with the various types of polymers are:

| Polymer | Organic Liquid |
| --- | --- |
| sulfonated polystyrene | benzene, toluene, ethyl benzene, methylethyl ketone, xylene, styrene, ethylenedichloride, methylene chloride. |
| sulfonated poly-t-butyl-styrene | benzene, toluene, xylene, ethyl benzene, styrene, t-butyl styrene, aliphatic oils, aromatic oils, hexane, heptane, decane, nonane. |
| sulfonated ethylene-propylene terpolymer | pentane, aliphatic and aromatic solvents, oils such as Solvent "100 Neutral", "150 Neutral" and similar oils, benzene, diesel oil, toluene, xylene, ethyl benzene, pentane, hexane, heptane, octane, isooctane, nonane, decane aromatic solvents, ketone solvents. |
| sulfonated styrene-methyl-methacrylate copolymer | dioxane, halogenated aliphatics, e.g., methylene chloride, tetrahydrofuran. |
| sulfonated polyisobutylene | saturated aliphatic hydrocarbons, diisobutylene, triisobutylene, aromatic and alkyl substituted aromatic hydrocarbons, chlorinated hydrocarbons, n-butyl ether, n-amyl, ether, methyl oleate, aliphatic oils, oils predominantly paraffinic in nature and mixtures containing naphthenic hydrocarbons. "Solvent 100 Neutral", "Solvent 150 Neutral" and all related |

| Polymer | Organic Liquid |
|---|---|
| | oils, low molecular weight polymeric oils such as squalene, white oils and process oils having 60 percent or less aromatic content. |
| sulfonated polyvinyl toluene | toluene, benzene, xylene, cyclohexane, ethyl benzene, styrene, methylene chloride, ethylene dichloride. |

The method of the instant invention includes incorporating a polar cosolvent, for example, a polar cosolvent in the mixture of organic liquid and water insoluble ionomer to solubilize the pendant ionomeric groups. The polar cosolvent will have a solubility parameter of at least 10.0, more preferably at least 11.0 and is water miscible and may comprise from 0.1 to 15.0 weight percent, preferably 0.1 to 5.0 weight percent of the total mixture of organic liquid, water insoluble ionomeric polymer, and polar cosolvent. The solvent system of polar cosolvent and organic liquid in which the water insoluble neutralized sulfonated (ionomeric) polymer is dissolved contains less than about 10 weight percent of the polar cosolvent, more preferably about 0.1 to about 5.0 weight percent, and most preferably about 0.1 to about 5.0 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of water soluble alcohols, amines, di- or trifunctional alcohols, amides, acetamides, phosphates, or lactones and mixtures thereof. Especially preferred polar cosolvents are aliphatic alcohols such as methanol, ethanol, n-propanol, isopropanol, 1,2-propane diol, monoethyl ether of ethylene glycol, and n-ethylformamide.

The amount of water added to the solution of water insoluble, neutralized sulfonated polymer, organic liquid and polar cosolvent having a viscosity of less than about 2,000 cps, is about 5 to about 500 volume percent of water, more preferably about 10 to about 300 volume percent water, most preferably about 10 to about 200 volume percent water.

DETAILED DESCRIPTION OF THE PREFERRED EMBODIMENT

The following examples will demonstrate the performance of sulfonated polystyrene of varying sulfonate levels in several specific aqueous environments.

EXAMPLE 1

It has been observed that under certain conditions, a hydrocarbon solution containing a low concentration of a sulfonated polystyrene or sulfonated EPDM is mildly agitated with water for a short period of time, a pseudo-emulsion is formed. In the initial formation stage, the type of pseudo-emulsion produced in these systems has a continuous aqueous phase while the hydrocarbon medium is the dispersed phase. It is believed that the sulfonated polymer stabilizes the hydrocarbon/water interface. Upon standing for a short period of time after mixing has occurred, it is observed that approximately 90 percent of the initial hydrocarbon solvent can be separated from the system leaving behind a pseudo-emulsion system characterized as a water-in-water pseudoemulsion. Addition of a small amount of non-ionic surfactant can be added to facilitate this process. Experimental evidence indicates that free passage of nonpolar organic solvent occurs through the sulfonated polymer membrane and the hydrocarbon solvent is replaced within each sphere by water as the nonpolar, organic solvent passes through the membrane.

As shown in Table I, the essential material needed for the formation of a pseudo-emulsion system in a hydrocarbon/water environment is the water insoluble, neutralized sulfonated polymer. Table I shows that the addition of water to a No. 2 diesel oil (or xylene) solution containing tridecyl alcohol as a cosolvent and/or unsulfonated EPDM (Socabu 55) or polystyrene (Styron 666) results in a classic phase separation of the hydrocarbon and water phases. On the other hand, spontaneous formation of a pseudo-emulsion system occurs in the presence of the sulfonated polymer. In addition, it has been observed that more stable pseudo-emulsion systems are produced with increasing sulfonation level. The nature of the counterion does not impair the interfacial activity of the polymer.

Further confirmation of the interfacial activity of these sulfonated polymers can be obtained utilizing viscosity measurements. The viscosity of several water-in-water pseudo-emulsions as a function of the polymer concentration is shown in Table II. It is readily apparent that due to the particular "macroscopic" structures formed in the aqueous phase, significant viscosification occurs as compared to the dissolution of a water soluble polymer of equivalent molecular weight and concentration. The viscosity of the pseudo-emulsion system at high polymer levels rises, while within the concentration range between approximately 1 and 5 g/l, the viscosity is essentially constant. Only when rather low polymer levels are reached does the viscosity begin to decline again. A comparison of the EPDM and polystyrene data indicates that the nature of the backbone chain may have little influence on the viscosity of the system, while the sulfonate level is of paramount importance. These results can be rationalized by assuming that the sulfonated polymer resides at the water-water interface. This latter observation is supported through the use of light microscopy. Under low magnification (approximately 100X) the structural details of the pseudo-emulsion system can be observed. In the first place, a large number of spheres constitutes a typical pseudo-emulsion system. Secondly, each pseudo-emulsion particle is a spherical structure in which a large volume of water is contained within the polymer film. The continuous phase outside of each particle is identical in composition to the internal aqueous phase.

EXAMPLE 2

Table II shows the relationship between the viscosity of the pseudo-emulsion phase, formed with polystyrene containing various sulfonation levels, as a function of polymer concentration. The viscosity tends to rise at very low polymer concentrations as was observed in FIG. 1. Outside of this concentration regime, the viscosity remains constant to rather high polymer levels (~0.5 g/dl.) The viscosity of the pseudo-emulsion at a particular polymer concentration does increase with higher sulfonation levels. Undoubtedly, this observation is related to both the sphere size and packing within the aqueous phase.

TABLE I
FORMATION OF WATER-IN-WATER PSEUDO-EMULSION (50 HYDROCARBON/50 WATER)

| Material | Water/Water Pseudo-Emulsion Formed |
|---|---|
| Tridecyl Alcohol | No |
| Socabu 55 or Styron 666 | No |
| Socabu 55/Tridecyl Alcohol | No |
| Zinc Neutralized (10-30 meq.) EPDM | Yes |
| Magnesium and Calcium Neutralized (10 meq.) EPDM | Yes |
| Magnesium and Calcium Neutralized (10 meq.) EPDM Tridecyl Alcohol | Yes |
| Unneutralized Sulfonated (25 meq.) EPDM Tridecyl Alcohol | Yes |
| Sodium Sulfonated (1-6 mole %) Polystyrene | Yes |
| Zinc Sulfonated (1-3 mole %) Polystyrene | Yes |

TABLE II
VISCOSITY* - POLYMER CONCENTRATION DATA OF A TYPICAL PSEUDO-EMULSION SYSTEM

| Material | Polymer Concentration (g/l) | Viscosity (cps) |
|---|---|---|
| Sulfonated Polystyrene (Sodium Salt - 1.7 mole %) | 0.25 | 210 |
| | 0.5 | 295 |
| | 1.25 | 315 |
| | 2.5 | 320 |
| | 5.0 | 340 |
| Sulfonated EPDM (Magnesium Salt - 10 meq.) | 0.50 | 160 |
| | 1.25 | 204 |
| | 2.5 | 210 |
| | 5.0 | 210 |

*Viscosity measured with a Brookfield ® viscometer at 30 RPM.

TABLE III
VISCOSITY* - POLYMER CONCENTRATION DATA OF SEVERAL PSEUDO-EMULSION SYSTEMS FORMED WITH SEVERAL SODIUM SALTS OF SULFONATED POLYSTYRENES

| Material (mole %) | Polymer Level (g/l) | Viscosity (cps) |
|---|---|---|
| 3.0 | 0.12 | 280 |
| | 0.5 | 430 |
| | 1.0 | 480 |
| | 2.0 | 490 |
| 4.19 | 0.12 | 380 |
| | 0.25 | 440 |
| | 0.5 | 570 |
| | 2.0 | 820 |
| 6.05 | 0.12 | 420 |
| | 0.25 | 540 |
| | 0.5 | 820 |
| | 2.0 | 950 |

*Viscosity measured with a Brookfield ® viscometer at 30 RPM.

EXAMPLE 3

Due to the aqueous nature of the fluid within the thin membrane of the pseudo-emulsion particle, we observe dramatic changes in viscosity as the shear rate is modified. Table IV shows the viscosity behavior of a typical pseudo-emulsion system in fresh water as a function of the rate of shear. At low shear rates, the viscosity is high, while a decrease is found at higher shear. Furthermore, we observe a marked viscosity decrease as the overall shear rate is increased, which is typical behavior of all pseudo-emulsion systems (i.e. fresh, salt, acid or basic environments). In this particular example, an order of magnitude viscosity change is found over a relatively modest shear rate range. Furthermore, we observe that this behavior is reversible (which again is typical behavior of a pseudo-emulsion system) within the shear rate range presented in this example.

TABLE IV
VISCOSITY - SHEAR RATE BEHAVIOR OF A TYPICAL PSEUDO-EMULSION SYSTEM IN FRESH WATER

| Material | Shear Rate ($sec^{-1}$) | Viscosity (cps) |
|---|---|---|
| Sulfonated Polystyrene (6.05 mole % - Sodium Salt) | 0.4 | 470 |
| | 0.8 | 390 |
| | 2.0 | 190 |
| | 4.0 | 120 |
| | 8.0 | 70 |
| | 16.0 | 68 |
| | 40.0 | 52 |
| | 79.0 | 45 |

It is evident from these discussions that this invention claims a markedly different process and product than that described in some previous patent applications (Ser. Nos. 223,482; 136,836; 106,027) covering the same class of polymers in similar mixed solvents. The prior applications were specifically directed at gelation of a hydrocarbon phase by contact of mixed solvents with an aqueous phase and extraction of a water miscible cosolvent from the organic phase, thereby permitting association of the ionic groups and gelation. In this and copending applications, we claim viscosification of the aqueous phase. Such a claim would certainly appear inconsistent and unexpected in view of those prior patent applications. This discussion will attempt to explain these observations on a molecular scale.

We assume that the ionic polymers of this study are dissolved in an organic diluent containing a polar cosolvent (alcohol) via selected solvation. The resulting ionic polymer is thereby homogeneously dissolved without substantial aggregation. Now, if sufficient polymer is present (i.e. >1%) for a conventional high molecular weight polymer, there is an overlap of the polymer coils (i.e., they intermingle and entangle). Under these conditions, if the cosolvent is removed (i.e., by contact with water), then the resultant aggregation of the ionic groups results in a total network or polymer gellation of the hydrocarbon phase occurs.

However, the unexpected observation which is the basis for the instant invention is that, if the polymer concentration in the hydrocarbon phase is less than 0.5% or so, the polymer coils no longer are in the overlap regime. Thus, entanglements between polymer chains do not obtain. Under these conditions, contact of the solution with water does not result in gelation, but rather the polymer forms the pseudoemulsion phase described herein. Thus, polymer concentration is the major variable and dominates which phase (aqueous or hydrocarbon) is viscosified.

What is claimed is:

1. A process for forming a thickened aqueous fluid having a viscosity of at least about 50 cps which consisting essentially the steps of:
   (a) forming a solvent system of an organic liquid and a polar cosolvent, said polar cosolvent being less than about 15 weight percent of said solvent system, a viscosity of said solvent system being less than about 100 cps;
   (b) dissolving a water insoluble, unneutralized or neutralized sulfonated polymer in said solvent system to form a solution, a concentration of said unneutralized or neutralized sulfonated polymer in said solution being about 0.01 to less than 0.4 weight percent, a viscosity of said solution being less than about 200 cps; and (c) adding about 5 to about 500 volume percent water to said solution, said water being immiscible with said solution, with said polar cosolvent and said water insoluble, neutralized sulfonated polymer transferring from said organic liquid to said water causing the viscosity of said water to increase to at least 50 cps.

2. A process according to claim 1 further including a means for removing said organic liquid from said aqueous fluid.

3. A process according to claim 1, wherein said un-neutralized or neutralized sulfonated polymer has about 10 (free acid) to about 100 (10.4 mole % sulfonation) meq. of sulfonate groups groups per 100 grams of polymer.

4. A process according to claim 3 wherein said $SO_3H$ are neutralized within an ammonium or metal counterion.

5. A process according to claim 4 wherein said metal counterion is selected from the group including antimony, tin, lead or Groups IA, IIA, IB or IIB of the Periodic Table of Elements.

6. A process according to claim 4 wherein said $SO_3H$ groups are at least 90 mole percent neutralized.

7. A process according to claim 1 wherein said neutralized sulfonated polymer is formed from an elastomeric polymer.

8. A process according to claim 7 wherein said elastomeric polymer is selected from the group including EPDM terpolymer or Butyl rubber.

9. A process according to claim 1 wherein said neutralized sulfonated polymer is formed from a thermoplastic.

10. A process according to claim 9 wherein said thermoplastic is selected from the group including polystyrene, t-butyl styrene, ethylene copolymers, propylene copolymers, or styrene/acrylonitrile copolymer.

11. A process according to claim 1 wherein said polar cosolvent has a greater polarity than said organic liquid.

12. A process according to claim 1 wherein said polar cosolvent is selected from the group including aliphatic alcohols, aliphatic amines, di- or trifunctional aliphatic alcohols, water miscible amides, acetamides, phosphates, or lactones and mixtures thereof.

13. A process according to claim 1 wherein said polar cosolvent is selected from the group including methanol, ethanol, propanol, isopropanol and mixtures thereof.

14. A process according to claim 1 wherein said polar cosolvent has a solubility parameter of at least about 10 and is water miscible.

15. A process according to claim 1 wherein said organic liquid is selected from the group including aromatic hydrocarbons, ketones, chlorinated aliphatic hydrocarbons, aliphatic hydrocarbons, cyclic aliphatic ethers, aliphatic ethers or organic aliphatic esters and mixtures thereof.

16. A process according to claim 1 wherein said organic liquid is selected from the group including aliphatic hydrocarbons or aromatic hydrocarbons.

17. A process according to claim 1 wherein said organic liquid is selected from the group including benzene, toluene, ethyl benzene, xylene or styrene and mixtures thereof.

18. A process according to claim 17 wherein said neutralized sulfonated polymer is formed from polystyrene.

19. The product prepared by the process of claim 1.

* * * * *